United States Patent
Azam et al.

(10) Patent No.: US 12,457,648 B2
(45) Date of Patent: Oct. 28, 2025

(54) ESTABLISHING COMMUNICATION CONNECTIONS

(71) Applicant: Hewlett-Packard Development Company, L.P., Spring, TX (US)

(72) Inventors: Syed S. Azam, Spring, TX (US); Louis R. Jackson, Jr., Spring, TX (US); Deepika Hegde, Spring, TX (US); Anthony Kaplanis, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 407 days.

(21) Appl. No.: 18/005,236

(22) PCT Filed: Jul. 14, 2020

(86) PCT No.: PCT/US2020/041924
§ 371 (c)(1),
(2) Date: Jan. 12, 2023

(87) PCT Pub. No.: WO2022/015289
PCT Pub. Date: Jan. 20, 2022

(65) Prior Publication Data
US 2023/0269789 A1   Aug. 24, 2023

(51) Int. Cl.
H04W 4/00     (2018.01)
H04W 36/30    (2009.01)
H04W 64/00    (2009.01)
H04W 76/10    (2018.01)
H04W 76/30    (2018.01)

(52) U.S. Cl.
CPC ......... *H04W 76/10* (2018.02); *H04W 36/302* (2023.05); *H04W 64/006* (2013.01); *H04W 76/30* (2018.02)

(58) Field of Classification Search
CPC . H04W 76/10; H04W 36/302; H04W 64/006; H04W 76/30; H04W 48/18; H04W 76/34; H04W 84/18; H04W 8/005
USPC .......................................................... 370/329
See application file for complete search history.

(56) References Cited

U.S. PATENT DOCUMENTS

| | | | |
|---|---|---|---|
| 7,469,827 B2 * | 12/2008 | Katragadda | G08G 1/123 235/375 |
| 8,346,938 B1 * | 1/2013 | Caddes | H04L 12/403 709/227 |
| 8,811,294 B2 * | 8/2014 | Sheth | H04W 72/04 370/328 |
| 9,484,986 B2 * | 11/2016 | Ling | H04W 72/0453 |
| 9,521,238 B1 | 12/2016 | Thanayankizil et al. | |
| 9,825,671 B2 * | 11/2017 | Ling | H04B 5/26 |
| 10,003,913 B2 | 6/2018 | Jin et al. | |
| 10,219,219 B2 | 2/2019 | Baron et al. | |

(Continued)

FOREIGN PATENT DOCUMENTS

| | | |
|---|---|---|
| WO | 2009/124299 A1 | 10/2009 |
| WO | 2015/104227 A1 | 7/2015 |

*Primary Examiner* — Amancio Gonzalez
(74) *Attorney, Agent, or Firm* — Quarles & Brady LLP (57) ABSTRACT

In an example system comprising a location engine and a protocol engine, the location engine determines a direction of movement between a first device and a second device and the protocol engine establishes a communication connection when a distance between the first device and the second deice is less than a distance designated for automatic connection.

5 Claims, 6 Drawing Sheets

(56) References Cited

U.S. PATENT DOCUMENTS

| | | | |
|---|---|---|---|
| 10,222,449 B2* | 3/2019 | Doescher | G01S 5/0284 |
| 10,349,325 B2* | 7/2019 | Ouzieli | H04W 36/32 |
| 10,356,585 B2* | 7/2019 | Ling | H04W 76/10 |
| 10,630,786 B2 | 4/2020 | Srinivasa Gopalan et al. | |
| 11,086,359 B2* | 8/2021 | Dees | H04L 67/51 |
| 11,150,317 B2* | 10/2021 | Stitt | H04W 88/02 |
| 11,595,804 B1* | 2/2023 | Lou | H04L 67/51 |
| 11,961,252 B1* | 4/2024 | Ebrahimi Afrouzi | ........... G06F 3/0346 |
| 12,133,294 B2* | 10/2024 | Cheong | H04L 1/0003 |
| 12,235,659 B2* | 2/2025 | Ebrahimi Afrouzi | A47L 9/30 |
| 2009/0252130 A1* | 10/2009 | Sheth | H04W 72/04 370/338 |
| 2012/0289160 A1 | 11/2012 | Palin et al. | |
| 2014/0282068 A1* | 9/2014 | Levkovitz | G06F 3/0482 715/748 |
| 2014/0330998 A1* | 11/2014 | Dees | G06F 9/4411 710/303 |
| 2014/0365611 A1 | 12/2014 | Praveenkumar et al. | |
| 2015/0282088 A1* | 10/2015 | Weizman | H04W 4/80 455/41.2 |
| 2016/0334837 A1* | 11/2016 | Dees | G06F 1/1632 |
| 2017/0286328 A1* | 10/2017 | Grosse-Puppendahl | ........... G06F 13/382 |
| 2018/0103076 A1 | 4/2018 | Lee et al. | |
| 2021/0281523 A1* | 9/2021 | Re | H04L 63/108 |

\* cited by examiner

```
                                    800
                                      ↘
┌─────────────────────────────────────────────────────────────────────┐
│  802 IDENTIFY A NEW DEVICE PAIR VIA A FIRST COMMUNICATION           │
│                           CONNECTION                                │
└─────────────────────────────────────────────────────────────────────┘
                                      ↓
┌─────────────────────────────────────────────────────────────────────┐
│ 804 CALIBRATE A SIGNAL STRENGTH CALCULATION BASED ON THE            │
│ RSSI SIGNAL OF THE FIRST COMMUNICATION CONNECTION AND A             │
│ DISTANCE PARAMETER WHEN THE NEW DEVICE IS PAIRED                    │
└─────────────────────────────────────────────────────────────────────┘
                                      ↓
┌─────────────────────────────────────────────────────────────────────┐
│  805 STORE PAIR INFORMATION INCLUDING CREDENTIALS FOR A             │
│            SECOND COMMUNICATION PROTOCOL                            │
└─────────────────────────────────────────────────────────────────────┘
                                      ↓
┌─────────────────────────────────────────────────────────────────────┐
│  806 ESTABLISH A FIRST COMMUNICATION CONNECTION BETWEEN             │
│        THE PERIPHERAL DEVICE AND THE HOST DEVICE                    │
└─────────────────────────────────────────────────────────────────────┘
                                      ↓
┌─────────────────────────────────────────────────────────────────────┐
│  808 DETERMINE WHETHER THE DEVICE PAIR IS AUTHORIZED TO             │
│     ESTABLISH A SECOND COMMUNICATION CONNECTION.                    │
└─────────────────────────────────────────────────────────────────────┘
                                      ↓
┌─────────────────────────────────────────────────────────────────────┐
│ 810 USE RSSI CALIBRATION DATASET TO DETERMINE IF THE FIRST          │
│ COMMUNICATION CONNECTION BETWEEN THE PERIPHERAL DEVICE              │
│ AND THE HOST DEVICE ACHIEVES THE AUTOMATIC CONNECTION               │
│                    SIGNAL STRENGTH                                  │
└─────────────────────────────────────────────────────────────────────┘
                                      ↓
┌─────────────────────────────────────────────────────────────────────┐
│ 812 SEND A REQUEST TO INITIATE A SECOND COMMUNICATION               │
│ CONNECTION BASED ON PAIR INFORMATION STORED WITH                    │
│ RESPECT TO THE PERIPHERAL DEVICE AND THE HOST DEVICE,               │
│              INCLUDING THE CREDENTIALS                              │
└─────────────────────────────────────────────────────────────────────┘
                                      ↓
┌─────────────────────────────────────────────────────────────────────┐
│ 814 TRANSFER DATA VIA THE SECOND COMMUNICATION                      │
│ PROTOCOL WHEN THE DEVICE PAIR CORRESPONDING TO THE                  │
│ HOST DEVICE AND THE PERIPHERAL DEVICE IS AVAILABLE FOR              │
│                    DATA TRANSFER                                    │
└─────────────────────────────────────────────────────────────────────┘
                                      ↓
┌─────────────────────────────────────────────────────────────────────┐
│  816 SEND A REQUEST TO DISCONNECT THE SECOND                        │
│  COMMUNICATION CONNECTION IN RESPONSE TO A                          │
│  DETERMINATION THAT THE FIRST DEVICE IS TRAVELING AWAY              │
│  FROM THE SECOND DEVICE BELOW AN AUTOMATIC                          │
│              DISCONNECTION THRESHOLD                                │
└─────────────────────────────────────────────────────────────────────┘
```

ESTABLISHING COMMUNICATION CONNECTIONS

BACKGROUND

Compute devices communicate with one another using communication protocols. For example, a compute device may establish a communication connection with another compute device using a wireless communication protocol. Some compute devices are portable and can be used in different environments, such an office or from home. Compute devices may communicate with other devices, such as peripheral devices, to extend the capabilities of the compute device.

DETAILED DESCRIPTION

In the following description and figures, some example implementations of apparatus, systems, and/or methods of data transfer are described. Data transfers are initiated between compute devices via communication connections. As used herein, a communication connection is any appropriate form of electronic method of wireless communication. For example, communication connections may use wireless communication protocols, such as personal area networks protocols (e.g., BLUETOOTH communication protocol), near-field communication (NFC) protocols, near-me area network (NAN) protocols, and wireless local area network (WLAN) protocols (e.g., IEEE 802.11 protocols). As used herein, a communication protocol refers to a collection of rules that allow two or more devices to transmit information. For example, the communication protocol can include a particular organization of the data packets or signals transmitted or received.

In examples described herein, a compute device may be an electronic device having a processor resource on which instructions may be executed to perform operations. Example categories of compute devices discussed herein are host devices and peripheral devices. As used herein, a host device is any form factor of a general-purpose computer that executes an operating system (OS), such as a desktop computer, a laptop computer, a tablet computer, or a mobile smartphone. A peripheral device is any electronic accessory coupleable to a host device to extend a capability to the host device. Example peripheral devices include display devices, keyboards, computer mice, printers, speakers, headsets, gaming controllers, and the like.

In examples described herein, a display device may be an electronic device to present content visually. Example displays may include a screen such as a liquid crystal display (LCD) panel, an organic light-emitting diode (OLED) panel, a micro light emitting diode (µLED), or other display technology. In some examples, a display device may also include video processor circuitry to operate the screen, such as a monitor scaler. A display device may present (e.g., displays) an image on a panel using image data to determine a color to display for every pixel on the panel. The source image data may include color data according to a color space such as red, green, and blue (RGB) channel data corresponding to a number of pixels of the panel to illuminate.

Display devices and other peripherals provide useful abilities to extend the capabilities of a host device. Some host devices are portable, such as notebook computers. Such portable host devices may move between workspaces. The portable host device may require a communication connection to be setup with peripheral devices when moving the host device to a new workspace. With the use of wireless communication technology, setup of peripheral devices has removed some of the physical connection requirements between host devices and peripheral devices.

Wireless communication technology may utilize a communication protocol that includes a prompt for connection and an acknowledgment of authorization for use, such as a personal identification number (PIN), before establishing a data transfer between devices. When moving into a workspace, the host device may renew connections with peripheral devices and request a pair acknowledgement before completing the communication connection. It can be irritating for mobile users with relatively frequent changes of workspaces to be requested to confirm use with a peripheral device multiple times as the device is moved between different locations.

Various examples described below relate to automatically establishing a communication connection with another device and/or automatically disconnecting a communication connection. By using a distance parameter and an automatic connection parameter, location information may be used to determine when to automatically establish a connection with a device and transfer data between devices. In some examples, information about a first communication connection using a first protocol may be leveraged to automatically establish a second communication connection. Indeed, data transfer may automatically start via a second communication connection by using pairing status and a distance parameter corresponding to the first communication connection, for example.

Figure 1A:
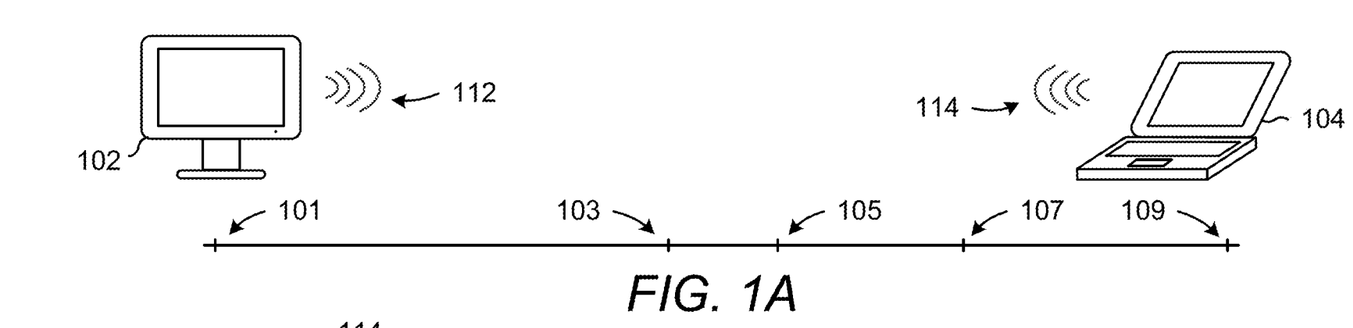
FIGS. 1A-1C depict example states of communication between example compute devices.
Figure 1B:
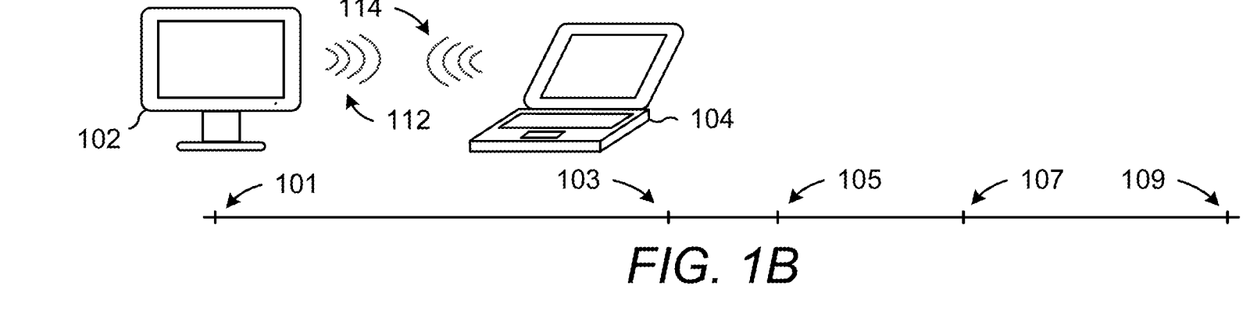
Figure 1C:
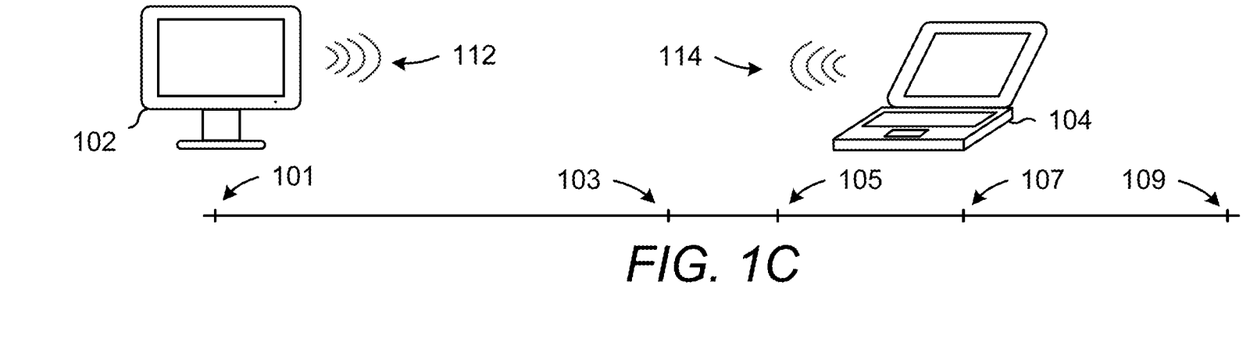

FIGS. 1A-1C depict example states of communication between example compute devices 102 and 104. In the examples of FIGS. 1A-1C, device 102 is a peripheral device and device 104 is a host device. Both compute devices 102 and 104 include transceivers to produce communication signals 112 and 114 respectively. As the devices 102 and 104 come closer together, the signal strength of the signals reached at each device increases. The signal strength decreases as the devices 102 and 104 move farther away from each other. The example compute devices 102 and 104 may include multiple communication technologies integrated within the device. For example, the peripheral device 102 may include a BLUETOOTH transceiver to communicate over BLUETOOTH protocol and a wireless network receiver to communicate over WIFI protocol.

Marks 101, 103, 105, 107, and 109 represent distances from the peripheral device. Mark 101 represents immediate proximity to the peripheral device 101. Mark 103 represents a distance at which automatic connection is available between the peripheral device 102 and another device (e.g., host device 104). The mark 103 may also represent a distance at which data transfer is allowed to automatically occur between the devices 102 and 104, wherein other examples the automatic data transfer may occur at a different distance (e.g., closer to the peripheral device 102 than the automatic connection distance to ensure a clean initiation of data transfer). Mark 105 represents a distance at which automatic disconnection is available between the peripheral device 102 and a device in communicative connection with peripheral device 102. The mark 105 may also represent a distance at which data transfer is terminated between device 102 and 104, wherein other examples the automatic data transfer termination may occur at a different distance (e.g., just before the automatic disconnection distance to ensure a clean disconnect). Mark 107 represents a maximum communication range of a first communication technology of the peripheral device 102. Mark 109 represents a maximum communication range of a second communication technology of the peripheral device 102. In this example, the automatic connection distance and the automatic disconnection distance are less than the maximum communication range of both the first communication technology and the second communication technology available to the devices 102 and 104. As will be described further herein, the shorter range, first communication technology may be used to initiate a connection over the longer range, second communication technology.

The location of the host device 104 depicted in FIG. 1A is beyond the maximum communication ability of the first technology (represented by mark 107). In that state, the host device 104 may not have a communication connection established with the peripheral device 102. As the host device 104 moves from a location represented in FIG. 1A to the location represented in FIG. 1B, the host device 104 comes into range of communication with a first communication technology and may establish a connection using the first communication technology. For example, the host device 102 may be paired with the peripheral device 104 using a BLUETOOTH protocol and a first communication connection may be made using the BLUETOOTH technology. Once the host device 104 comes into the automatic connection distance from the peripheral device 102, a second communication connection may be automatically generated based on pair information corresponding to the first communication connection. In this manner, a user of the device may expect a peripheral device to become automatically useable without further assistance to generate the pairing, such as by providing credentials. Indeed, the trust between a pairing of devices may be leveraged from one first communication connection to a second communication connection, in particular when the paired devices are known and are associated with the second communication technology (e.g., if authorized data has been transferred between the devices over the second communication protocol previously). As discussed further herein, the systems herein may track and store security credentials or other related parameters for establishing connections via various protocols. With the automatic communication connection established, data may be transferred between the host device and the peripheral device via the automatically created communication connection and in response to being within the automatic connection distance 103. Some data exchanges over certain protocols may utilize signal strength to ensure a level of connection quality or reduced latency, such as video transfer protocols, and establishing an automatic connection range that is not near the maximum technology capabilities may be preferable to meet signal quality requirements, for example. In other examples, a user may simply want to ensure connection happens when a notebook is placed on a desk and not in other parts of the room so a relatively short automatic connection distance may be desired. In this manner, a user may have a computing environment where location of the host device indicates a desire for automatic data transfer among known device pairs within a selected distance parameter, for example.

If the host device 104 moves to a distance as represented in FIG. 1C, beyond the automatic disconnection distance represented by mark 105, the second communication connection is disconnected, even though it is less than the maximum communication ability of the communication technology. In this manner, the communication connections established between devices may be based on the distance between devices. As discussed further herein, the distance between devices may be determined based on signal strength relative to the transceivers of each device. For example, a signal strength threshold representing an estimated distance for a transceiver of the type embedded in the host device 104 may be determined and a communication connection may be established when a received signal strength indicator (RSSI) corresponding to the signals 114 from the host device 104 is greater than the determined signal strength. As used herein, a threshold is a value or classification representing a reference against which another value or classification is measured or compared. Example thresholds may be a single value or a range of values that represent a signal strength or a distance.

The automatic disconnection distance (represented by mark 105) may be designated with at least a tolerance distance from the automatic connection distance (represented by mark 103) to ensure automatic connection and automatic disconnection does not happen too quickly or in a loop. (Overlapping automatic connection thresholds and disconnection thresholds may generate unreliable or unexpected connection performance, for example.) By calibrating the automatic disconnection threshold to be different from the automatic connection threshold based on a signal strength tolerance, the automatic connection may occur reliably and/or at an intuitive distance based on the peripheral device (e.g., based on the functionalities extended by the peripheral device), for example. In some examples described herein, the automatic connection distance and/or the automatic disconnection distance are set and/or otherwise defined by a user. For example, the user may set a closer automatic connection distance for video data transfers than an automatic connection distance for audio data transfers. In this manner, the user may be able to customize the automatic connection and automatic disconnection experience among devices.

Figure 2:
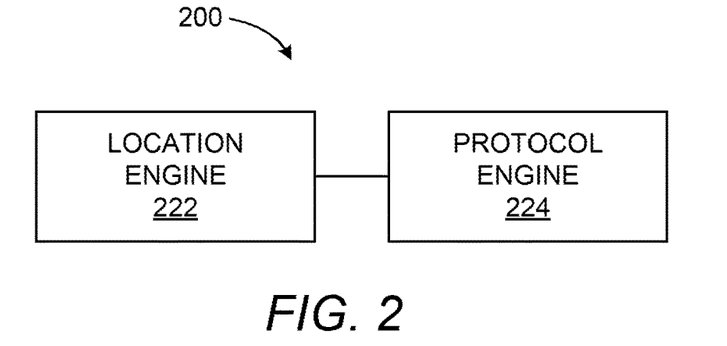
FIGS. 2 and 3 are block diagrams depicting example systems to establish an example communication connection between example compute devices.
Figure 3:
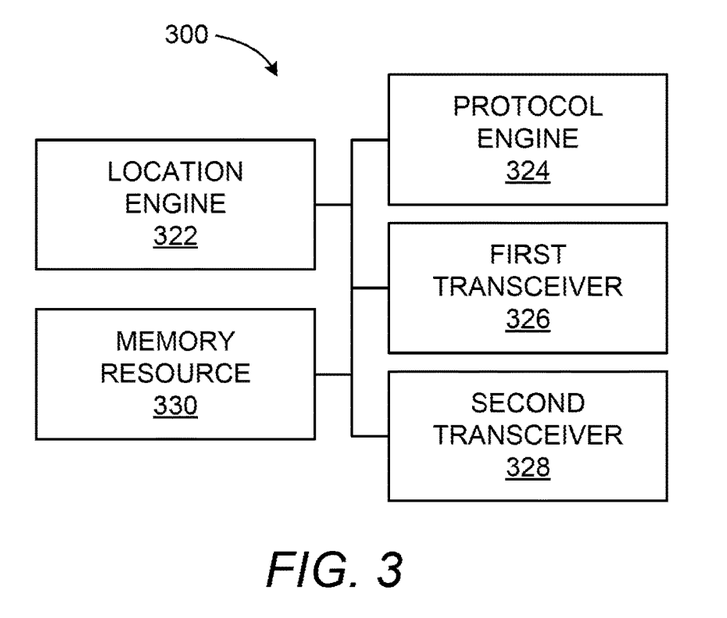

FIGS. 2 and 3 are block diagrams depicting example systems 200 and 300 to establish an example communication connection between example compute devices. Referring to FIG. 2, the system 200 generally includes a location engine 222 and a protocol engine 224. In general, the protocol engine 224 establishes a communication connection based on signal information identified by the location engine 222. The systems 200 and 300 represent an apparatus having a physical structure to implement the operations discussed herein, such as an electronic device with circuits to perform the operations discussed herein or a storage medium having instructions stored thereon representing the operations discussed herein.

The location engine 222 represents any circuitry or combination of circuitry and executable instructions to identify a direction of movement between a first device and a second device. For example, the location engine 222 may be a combination of circuitry and executable instructions to determine that a signal strength between devices is increasing in strength or decreasing in strength and report the changing state to the protocol engine 224.

The location engine 222 may perform calibration operations and distance determinations. For example, the location engine 222 may be circuitry to identify a first distance of a peripheral device from a host device based on a RSSI via a first protocol and perform a signal strength calibration for the host device based on the RSSI associated with a signal from the peripheral device. RSSI is an estimated measure of power level that a receiver from one device is receiving from a transmitter of another device. An RSSI dataset, as used herein, is a set of data corresponding to signal strength values derived from at least one RSSI received corresponding to a device pair.

The signal strength calibration may be performed to identify the expected range of strength for a device. Devices may have asymmetric signal strength based on location of the antenna within the device, and, therefore, a RSSI may be different when the host device is approximately the same distance from the peripheral device, but in a different orientation. In this circumstance, a distance of a device may be determined based on an estimated range of signal strength that may be unique to that device. In this manner, if the range of signal strength is sufficiently large based on the automatic connection distance, this range may be used to determine a tolerance distance to generate a minimum difference between the automatic disconnection distance and the automatic connection distance.

By performing a signal strength calibration for each device pair, an individualized signal strength estimation may be generated and associated with an expected distance for automatic connection or automatic disconnection. Indeed, the location engine 222 may be circuitry to perform a signal strength threshold calibration to determine a signal strength minimum corresponding to a distance associated with automatic connection, such as an automatic connection distance defined by a user. In general, signal strength calibrations may be performed upon initial pairing between devices and may be stored with pair information corresponding to the associated device pair. In some examples, calibration may be updated when the automatic connection distance or the automatic disconnection distance changes.

The protocol engine 224 represents any circuitry or combination of circuitry and executable instructions to establish a communication connection when a first distance between a first device and a second device is less than a second distance designated for automatic connection. For example, the protocol engine 224 may be a combination of circuitry and executable instructions to establish a communication connection when a first distance between the peripheral device and the host device is less than a second distance designated for automatic connection and in response to a determination that the peripheral device has been previously paired with the host device and the direction of movement of the host device is towards the peripheral device.

The protocol engine 224 may manage multiple connection technologies and multiple connection protocols over those technologies. For example, the protocol engine 224 may be circuitry that establishes a communication connection via a protocol different from the protocol via which an RSSI is received or an initial pairing occurred. Indeed, the protocol engine 224 may establish a first communication connection between a device pair via a first protocol, receive location information from the location engine 222 corresponding to the first protocol, and establish a second communication connection between the device pair via a second protocol in preparation to perform a data transfer over the second communication connection. Example data to transfer over the second communication connection established by the protocol engine 224 includes audio data and/or video data, where such data may be better transferred over the second communication connection rather than the first communication connection in some instances.

In an example, the protocol engine 224 establishes a communication connection via WIFI between a first device and second device based on location information provided by the location engine 224 (e.g., distance and trajectory of a device) and pair information corresponding to the first device and the second device (where the location information and the pair information may be determined based on a BLUETOOTH connection between the first device and the second device), and the protocol engine 224 causes a data transfer of audio/video data to initiate over WIFI DIRECT protocol via the WIFI communication connection. In some examples, multiple protocols may be available for generating the automatic connection between a device pair and the protocol engine 224 may select the protocol or communication technology to generate the second communication connection based on the pair information associated with the first communication connection of a device pair and a user preference. Indeed, in yet further examples, multiple protocols and communication connections may be utilized to establish a communication connection via which data is transferred. For example, a secure NFC communication connection may be used to initiate a BLUETOOTH exchange, a WIFI communication connection is established based on the pair information corresponding to the BLUETOOTH protocol, and data is transferred via the WIFI communication method via MIRACAST protocol.

In some examples, the protocol engine 224 causes the data transfer to be automatically initiated in response to the second communication connection being established. In some examples, the protocol engine 224 may include a combination of circuitry and executable instructions to identify a user preference that designates a threshold (e.g., a signal strength threshold and/or a distance threshold) for automatic connection as a user-defined connection distance—where the user preference may also indicate whether to establish the communication connection between the peripheral device and the host device within the user-defined connection distance- and cause the communication connection to be established based on the user preference designating the protocol to be used for automatic connection. In this manner, a user preference represents a data structure with variables corresponding to automatic connection parameters and/or automatic disconnection parameters and the user may be able to establish conditions on which to automatically establish a connection between a device pair and automatically transfer data between the device pair.

The protocol engine 224 may represent any circuitry or combination of circuitry to disconnect the communication connection when the first distance between the first device and second device is greater than the second distance. For example, the protocol engine 224 may be a combination of circuitry and executable instructions to disconnect the communication connection between the host device and peripheral device when the first distance between the peripheral device and the host device is greater than the second distance in response to a determination that the direction of movement of the host device is away from the peripheral device. For another example, the protocol engine 224 may be circuitry to disconnect the communication connection when the current distance between the peripheral device and the host device is greater than a threshold distance that is less than the maximum distance corresponding to the protocol technology and greater than the automatic connection distance by a tolerance distance corresponding to a measurement tolerance of the signal strength for that device pair. As used herein, disconnection includes termination of a data transfer over a communication connection and may include termination of the communication connection. Disconnection may be different from tearing down the communication connection between devices or unpairing devices. In some examples, the protocol engine 224 may cause disconnection of multiple communication connections when the distance between devices passes the automatic disconnection threshold.

Figure 5:
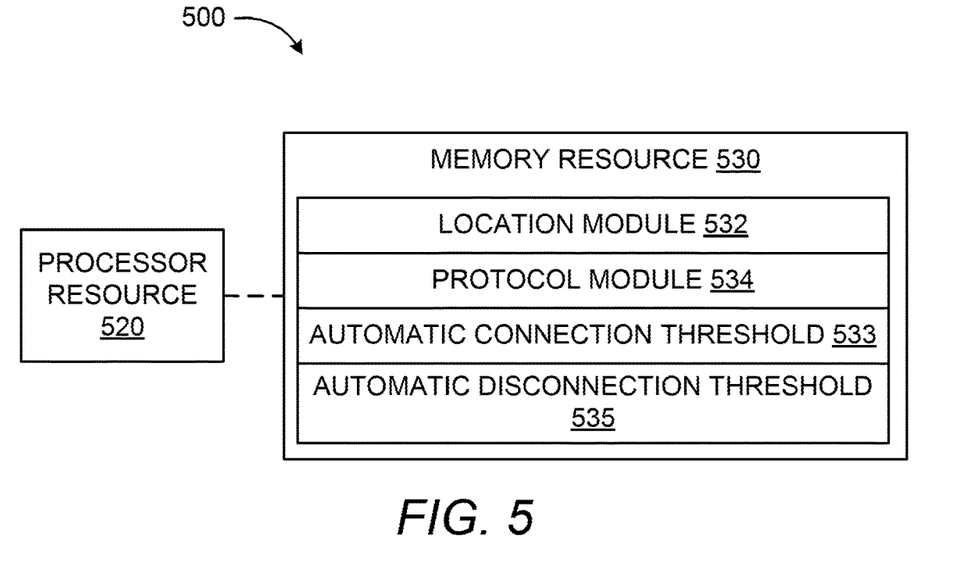
FIGS. 5 and 6 are block diagrams depicting example systems to establish an example communication connection between example compute devices.
Figure 6:
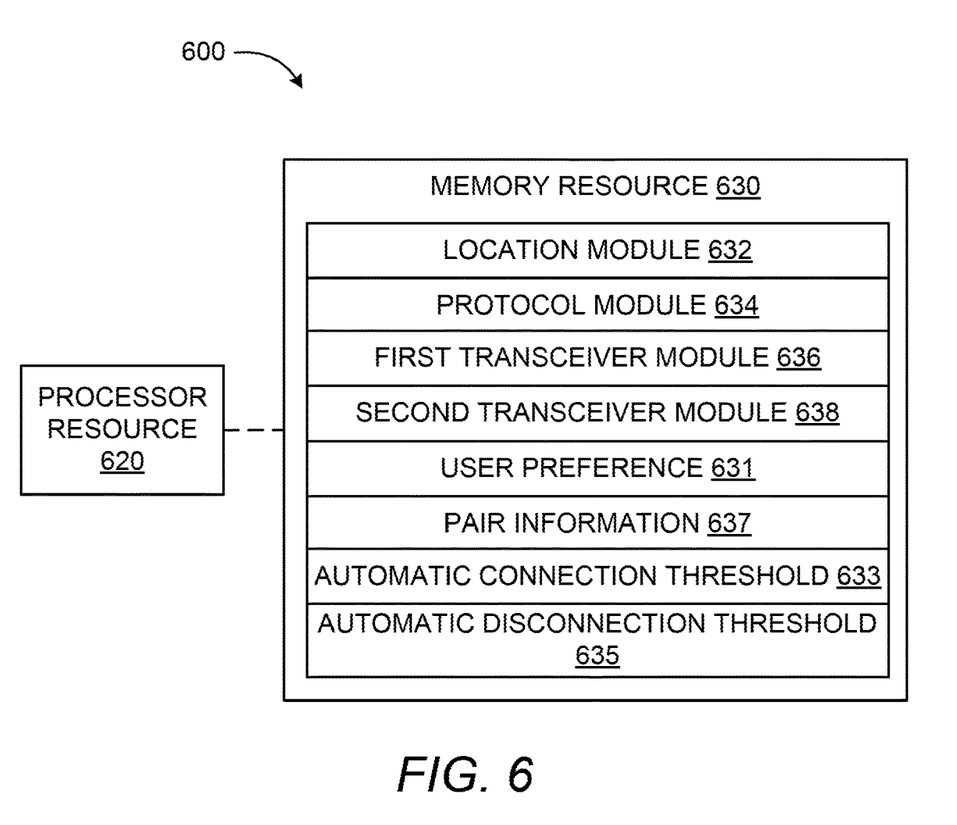
Figure 7:
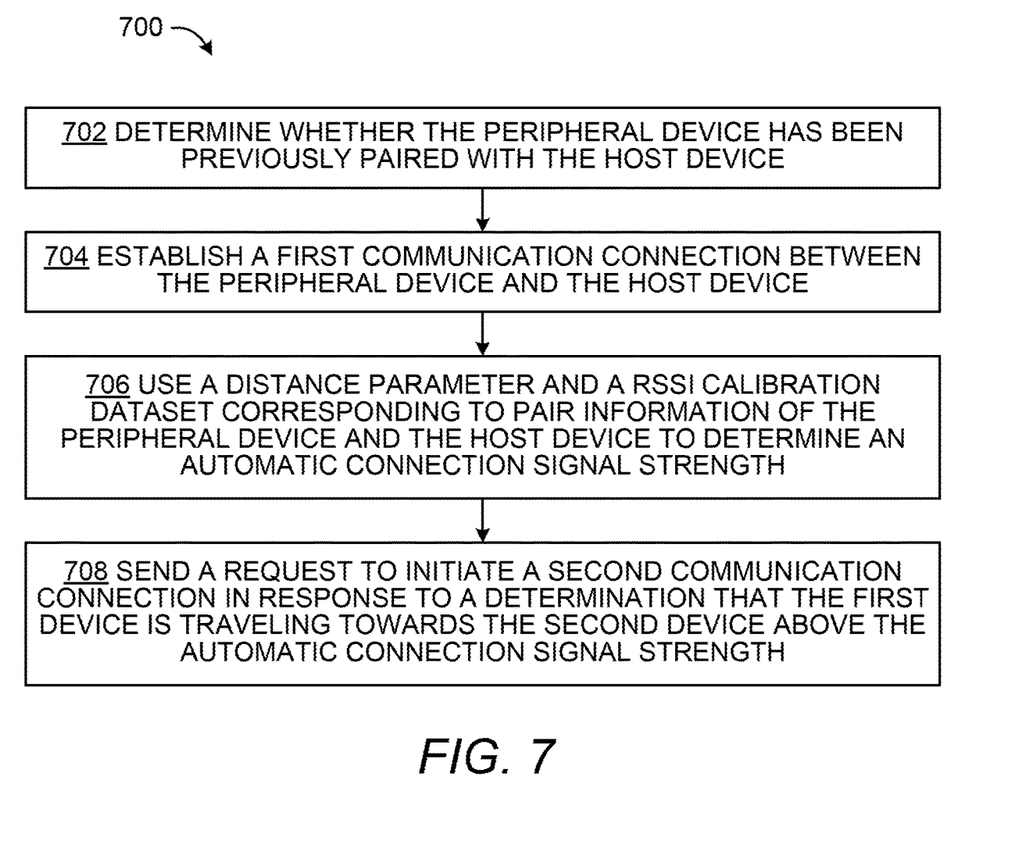
FIGS. 7-9 are flow diagrams depicting example methods of data transfer.
Figure 8:
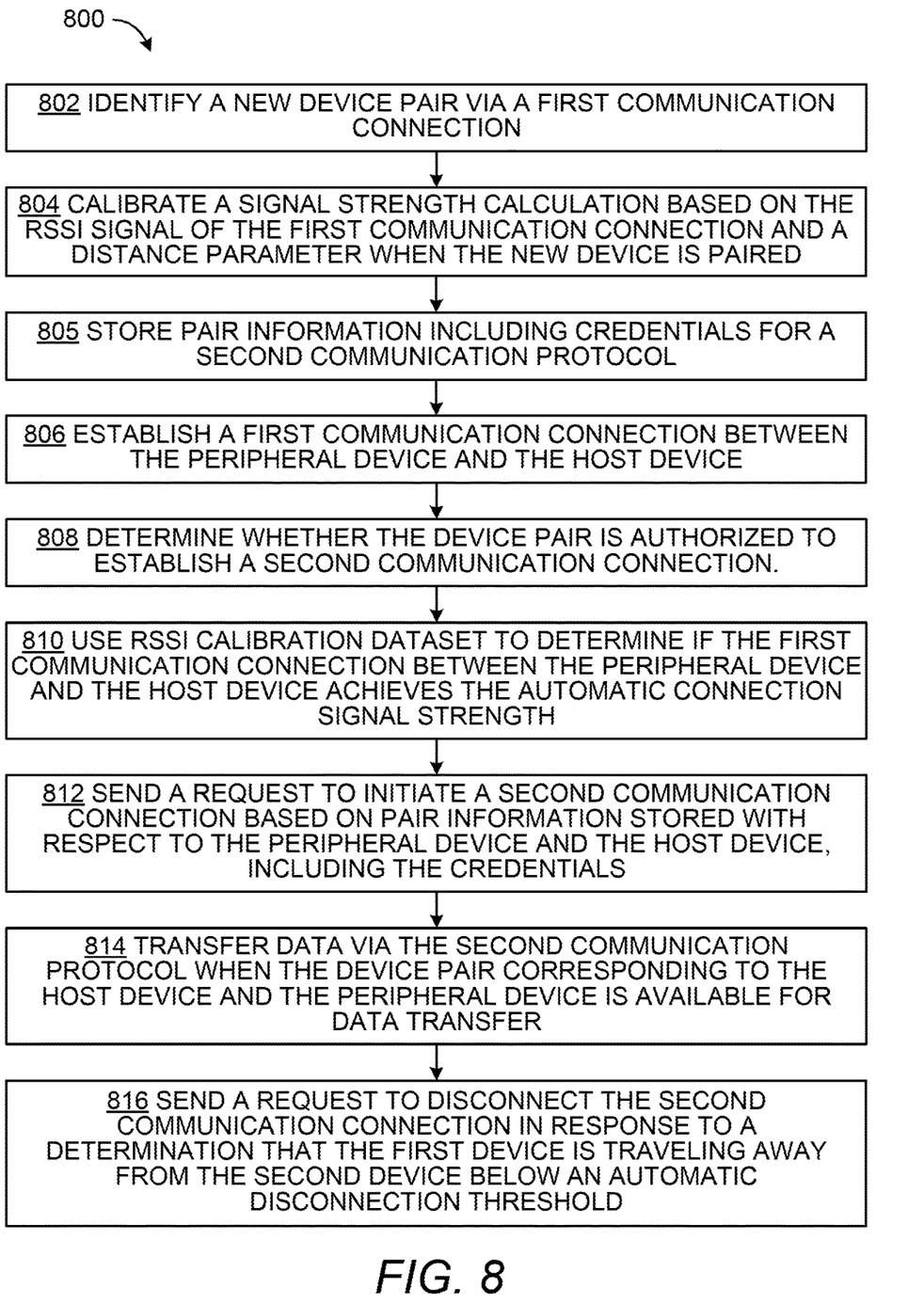
Figure 9:
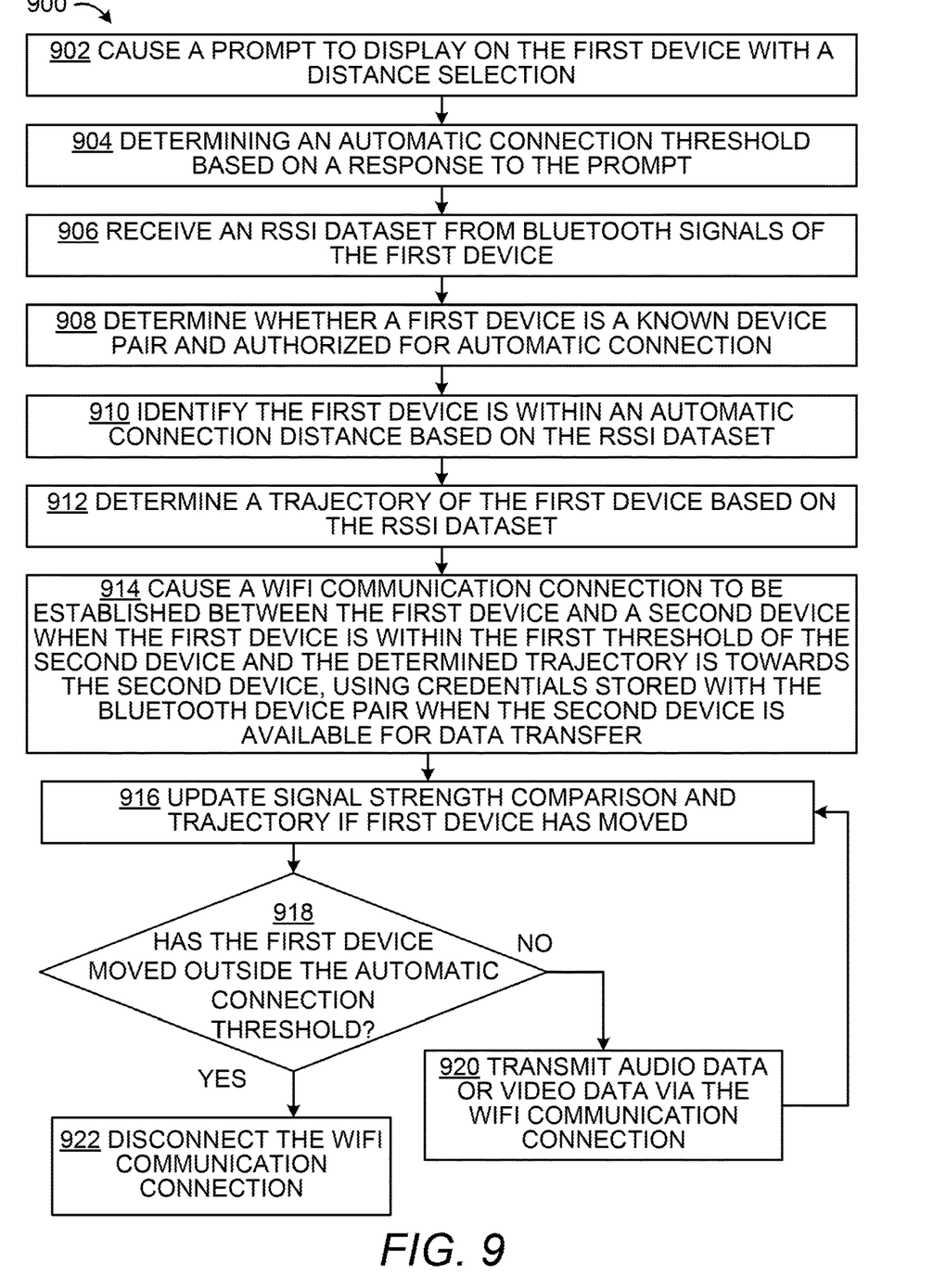

In some examples, functionalities described herein in relation to any of FIGS. 1-6 may be provided in combination with functionalities described herein in relation to any of FIGS. 7-9.

Referring to FIG. 3, the system 300 generally includes a location engine 322 and a protocol engine 324 that are the same as the location engine 222 and the protocol engine 224 of FIG. 2, and, for brevity, their respective descriptions are not repeated in their entirety. The system 300 of FIG. 3 includes a memory resource 330, a first transceiver 326, and a second transceiver 328.

The memory resource 330 may be used to store information, such as location information received from a transceiver, pair information corresponding to a device pair, and an automatic connection threshold. As used herein, pair information refers to data corresponding to a pairing between device (i.e., a device pair) and location information refers to data corresponding to a location of device, which may be more specifically related to a signal strength of the device at a distance from another device. Another example of datasets storable with a memory resource are depicted and described with respect to FIG. 6.

A memory resource, such as memory resource 330, represents a medium to store data utilized and/or produced by the system 300. The medium is any tangible, non-transitory medium or combination of non-transitory media able to electronically store data, such as computer-readable instructions and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions.

The location engine 324 may obtain location information using the first transceiver 326 and the protocol engine may establish a communication connection using the second transceiver 328. The first transceiver 326 and the second transceiver 328 may transmit signals using different technologies. Example technologies to communication over include BLUETOOTH, NFC, WIFI, and the like. For example, the first transceiver 326 may be a class 2 BLUETOOTH transceiver with a maximum range of 10 meters and the second transceiver 328 may be a class 1 BLUETOOTH transceiver with a maximum range of 100 meters. In some examples, a transceiver may be integrated in or otherwise part of the location engine 322 and/or the protocol engine 324.

Figure 4:
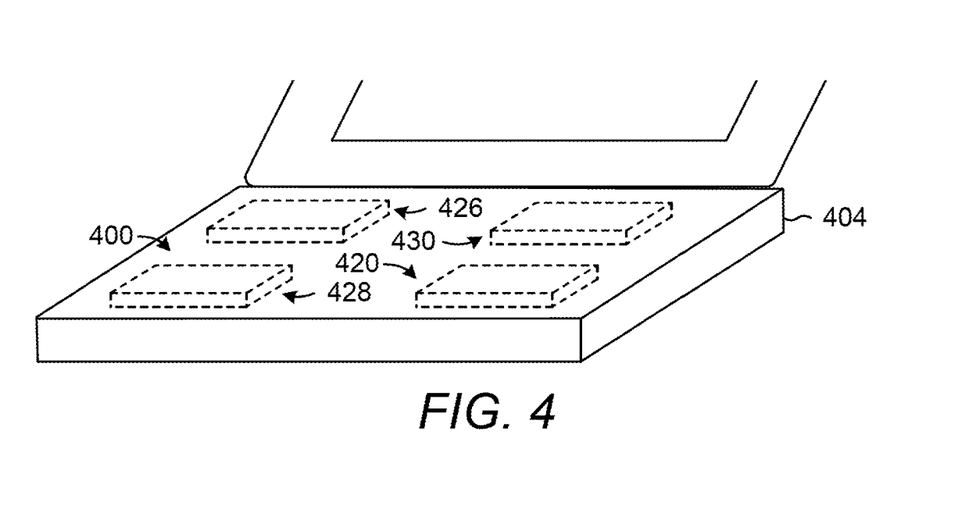
FIG. 4 depicts an example environment in which an example system to establish an example communication connection is implemented.

FIG. 4 depicts an example environment 404 in which an example system 400 to establish an example communication connection is implemented. The example of FIG. 4 depicts components of a host notebook device 404 as part of the system 400 which may perform operations the same as system 200 and/or 300 of FIGS. 2 and 3 respectively. The system 400 includes a first transceiver 426, a second transceiver 428, a memory resource 430, and a processor resource 420. The processor resource 420 may execute instructions stored on the memory resource 430 to control operations of the first transceiver 426 and the second transceiver 428. In this example, the combination of the processor resource 420 and executable instructions stored on the memory resource 430 are the components to perform the operations described with respect to the location engine 222 and the protocol engine 224 of FIG. 2. Indeed, in some examples, the location engine and the protocol engine may be implemented on the same controller, where a controller includes a processor resource and a memory resource integrated on the same printed circuit board and/or chip. Thus, although the various engines or modules are shown as separate engines in FIGS. 2-6, in other implementations, the functionality of multiple engines and/or modules may be implemented as a single engine and/or module or divided in a variety of engines and/or modules. In some example, the engines of the systems 200 may perform example methods described in connection with FIGS. 1 and/or 7-9.

FIGS. 5 and 6 are block diagrams depicting example systems 500 and 600 to establish an example communication connection between example compute devices. FIG. 5 depicts the example system 500 may comprise a memory resource 530 operatively coupled to a processor resource 520. The memory resource 530 may contain a set of instructions that are executable by the processor resource 520 and datasets used to execute the set of instructions, such as an automatic connection threshold 533 and an automatic disconnection threshold 535. The automatic connection threshold 533 and the automatic disconnection threshold 535 represent data structures that contain variables representing a threshold value or threshold classification for determining automatic connections, such as a signal strength value, a range of signal strength values, a distance value corresponding to a distance at which automatic connection or disconnection is expected by default or defined by the user, etc.

The set of instructions stored on the memory resource 530 are operable to cause the processor resource 520 to perform operations of the system 500 when the set of instructions are executed by the processor resource 520. The set of instructions stored on the memory resource 530 may be represented as a location module 532 and a protocol module 534. The location module 532 and the protocol module 534 represent program instructions that when executed cause function of the location engine 222 and the protocol engine 224 of FIG. 2, respectively. The processor resource 520 may carry out a set of instructions to execute the modules 532, 534, and/or any other appropriate operations among and/or associated with the modules of the system 500.

For example, the processor resource 520 may carry out a set of instructions to determine whether the first device is part of a known device pair and that the known device pair is authorized for automatic connection in response to detection of signals (e.g., BLUETOOTH low energy signals) of a first device, determine the trajectory of the first device and whether the signals of the first device are above a signal strength threshold (e.g., whether the first device is within a first threshold distance) based on a RSSI dataset corresponding to the detected signals of the first device, and cause a communication connection to be established between the first device and a second device when the first device is within the signal strength threshold of the second device and the determined trajectory is towards the second device when the first device and the second device are a known device pair that is authorized for automatic connection. In that example, the signal strength threshold is greater than a minimum signal strength capability of the protocol being used, such as BLUETOOTH signals having a minimum strength to establish a BLUETOOTH connection where the signal strength threshold is greater than the minimum strength to establish a BLUETOOTH connection.

For another example, the processor resource 520 may carry out a set of instructions to cause the communication connection to be disconnected when the first device passes a second threshold that is less than the first signal strength threshold and greater than the minimum signal strength capability of the detected signals, where the automatic connection distance is separated from an automatic disconnection distance by more than a tolerance amount.

For yet another example, the processor resource 520 may carry out a set of instructions to cause initiation of a video data transfer over the communication connection in response establishing the communication connection when the first device is within the automatic connection distance threshold of the second device and the determined trajectory is towards the second device.

For yet another example, the processor resource 520 may carry out a set of instructions to cause a prompt to display on the first device with a distance selection, determine an automatic connection distance threshold and the automatic disconnection distance threshold based on a response to the prompt and an initial dataset corresponding to the RSSI dataset associated with a known device pair (e.g., the first device and a second device), determine the signal strength threshold based on a user preference corresponding to the response to the prompt and the RSSI calibration dataset associated with the known device pair, store a set of credentials for a second protocol with pair information corresponding to a pairing of the first device and the second device via the first protocol, cause the communication connection to initiate over a second protocol (e.g., WIFI DIRECT protocol) in response to detection of a connect event initiated by the a first set of signals (e.g., BLUETOOTH signals) of the first device when the first device is available for dedicated data transfer, and use a set of credentials for the second protocol to establish the communication connection, where the set of credentials are stored with pair information of the first protocol corresponding to the known device pair.

A processor resource is any appropriate circuitry capable of processing (e.g., computing) instructions, such as one or multiple processing elements capable of retrieving instructions from a memory resource and executing those instructions. For example, the processor resource 520 may be a central processing unit (CPU) that enables data transfer by fetching, decoding, and executing modules 532 and 534. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

The memory resource 530 may be said to store program instructions that when executed by a processor resource cause the processor resource to implement functionality of the system 500 of FIG. 5. The instructions residing on a memory resource may comprise any set of instructions to be executed directly (such as machine code) or indirectly (such as a script) by a processor resource. A memory resource may be integrated in the same device as a processor resource or it may be separate but accessible to that device and the processor resource. A memory resource may be distributed across devices.

In some examples, the system 500 may include the executable instructions may be part of an installation package that when installed may be executed by a processor resource to perform operations of the system 500, such as methods described with regards to FIGS. 7-9. In that example, a memory resource may be a portable medium such as a compact disc, a digital video disc, a flash drive, or memory maintained by a computer device, such as a web server, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

FIG. 5 depicts the executable instructions may be processor-executable instructions, such as program instructions, stored on the memory resource 530, which is a tangible, non-transitory computer-readable storage medium, and the circuitry may be electronic circuitry, such as processor resource 520, for executing those instructions. This an example of a number of implementation possibilities for the engines 222 and 224 of FIG. 2, which have been described as circuitry or a combination of circuitry and executable instructions. Indeed, the engine and/or modules may complete or assist completion of operations performed in describing another engine and/or module. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 6 depicts yet another example of how functionality may be organized into modules.

Referring to FIG. 6, the memory resource 630 may contain the instructions and data depicted in FIG. 5 as well as a first transceiver module 636, a second transceiver module 638 and various data useable with the operations of the data transfer system 600. The first transceiver module 636 and the second transceiver module 638 represent program instructions, that when executed by the processor resource 620, to cause operations of a first transceiver and a second transceiver, respectively, such as the first transceiver 326 and the second transceiver 328 of FIG. 3.

Datasets useable with the system 600 include a user preference 631, pair information 637, a connection threshold 633, and a disconnection threshold 635. The connection threshold 633 and the disconnection threshold 635 may be the same as the connection threshold 533 and the disconnection threshold 535 of FIG. 5. As used herein, a dataset is any number of datum and may be a group of multiple sets of data. The user preference 631 represents a data structure including a variable for a user-defined parameter (e.g., parameters selected by a user or a system default parameter) for causing automatic connection, such as a flag for determining a user selection for automatic connection is enabled or not, a protocol selected for automatic connection (e.g., multiple protocols may be available for connection and the user may have a preference or priority for a particular protocol), a signal strength or distance selected by a user for automatic connection, etc. The pair information 637 represents a data structure including a variable representing a parameter for connection of a device pair. Example pair information includes the names of the devices of the device pair, a protocol over which the devices are paired, pair history, a set of credentials used to authenticate the pair and authorize communication between devices of the device pair, etc. In some examples, the set of credentials stored for the pair information are associated with a separate communication connection or communication protocol other than the communication connection or communication protocol for which the device pair information was stored. In this manner, pair information may include connection information for various connection methods.

FIGS. 7-9 are flow diagrams depicting example methods 700, 800, and 900 of data transfer. The example methods 700, 800, and/or 900 may be performed by engines of the system 200 of FIG. 2. In other examples, a processor resource may be programmed to fetch, decode, and execute instructions of the modules of FIG. 5 to cause the operations of the methods 700, 800, and/or 900.

Referring to FIG. 7, example method 700 of data transfer may generally comprise identifying a device pair, establishing a first communication connection, determining an automatic connection signal strength, and sending a request to initiate a second communication connection. At block 702, a determination is made by a processor resource whether the peripheral device has been previously paired with the host device. For example, a list of previously paired devices may be compared to a peripheral device and/or a host device. At block 704, a first communication connection is established between the peripheral device and the host device. For example, a BLUETOOTH connection may be automatically established between two devices that have been previously paired together (i.e., the device pair is a known device pair).

At block 706, an automatic connection signal strength is determined by a processor resource using a distance parameter and a RSSI calibration dataset corresponding to pair information of the peripheral device and the host device. For example, the signal strength may be determined upon establishing a BLUETOOTH pairing between devices and that determined signal strength may be used to compare to an expected signal strength corresponding to the distance parameter. The distance parameter is the distance at which automatic connection is to be made. The distance parameter represents a distance threshold between devices, may be a system setting, and may be changeable by a user, for examples. The RSSI calibration dataset is a set of data that represents the initial determination of a base signal strength corresponding to a device (e.g., between a device pair). The base signal strength may be used to calculate or otherwise determine a signal strength threshold corresponding to the distance between devices represented by the distance parameter.

At block 708, a request to initiate a second communication connection is sent via processor resource in response to a determination that the first device is traveling towards the second device at a signal strength above the automatic connection signal strength. For example, the determination of the first device traveling towards the second device may utilize the signal strength of a first communication connection and establish a second communication connection using a different protocol from the first communication connection, for example. With the second communication connection established, data may be transferred between the peripheral device and the host device (such as audio data and/or video data) via the second communication connection. For example, the first communication connection may use a BLUETOOTH protocol, the second communication connection may use an 802.11 protocol, and the data transfer includes a transfer of video data using a WIFI DIRECT protocol (such as a MIRACAST communication protocol) via the second communication connection. In this manner, a BLUETOOTH pairing exchange between a notebook device and a computer monitor may automatically initiate a WIFI communication connection and transfer video content from the notebook device to project on the computer monitor when the notebook device is within the automatic connection signal strength threshold.

FIG. 8 includes blocks similar to blocks of FIG. 7 and provides additional blocks and details. In particular, FIG. 8 depicts additional blocks and details generally regarding identifying a new device pair, calibrating a signal strength calculation, transferring data between devices, and sending a request to disconnect the second communication connection. Blocks 806, 808, 810, and 812 are the same as blocks 702, 704, 706, and 708 of FIG. 7 and, for brevity, their respective descriptions are not repeated in their entirety.

At block 802, a new device pair is identified via the first communication connection. At block 804, in response to a new device pair being identified, an RSSI signal is received via the first communication connection and a signal strength calculation is calibrated using the RSSI signal and a distance parameter corresponding to a distance at which the user expects to make an automatic connection. Signal strength calibration may be performed for each unique device pair to compensate for any individualized signal strength trends corresponding to distance for the particular transceivers being used to communicate between the devices, for example. At block 805, a credential for a second communication protocol is stored with the pair information corresponding to the first communication protocol. In this manner, the pair information for a device pair may include various parameters for a number of protocols via which communication is possible (or has happened) between devices of the device pair. The first communication connection is established between the device pair at block 806.

At block 808, a determination is made by a processor resource as to whether the device pair is authorized to establish a second communication connection. In some examples, this may be based on whether the peripheral device has been previously paired with the host device. In an example where the device pair is new for the first communication protocol, pair information regarding a second communication protocol may be retrieved and used to establish the second communication protocol automatically (e.g., for example, using stored credentials from a previous WIFI connection). In yet other examples, a user may manually set up the automatic connection details (e.g., a distance parameter and security credentials) for the first pairing of the second communication protocol and request the automatic connection details be saved as part of the pair information for the first communication protocol.

At block 810, a determination is made by a processor resource as to whether the first communication connection between the peripheral device and the host device achieves the automatic connection signal strength threshold (e.g., the connection signal strength is greater than the automatic connection signal strength) using the calibrated signal strength calculation (calibration at block 804).

If the automatic connection signal strength threshold is achieved, a request to initiate a second communication connection is sent based on pair information stored with respect to the device pair (e.g., the pairing between the peripheral device and the host device) at block 812. The request may be sent with security credentials, such as a PIN usable with the WIFI DIRECT protocol stored at block 805 with the pair information for the BLUETOOTH protocol of a corresponding device pair. The distance threshold corresponding to the automatic connection distance is less than the protocol maximum distance of the first protocol of the first communication connection, the distance threshold corresponding to the automatic disconnection distance is less than the protocol maximum distance of the first protocol of the first communication connection and greater than the automatic connection distance, and the protocol maximum distance of the first communication connection may be less than the protocol maximum distance of the second communication connection.

At block 814, data is transferred between the peripheral device and the host device via the second communication protocol when the peripheral device is available for data transfer. In some examples, the automatic connection and automatic data transfer may occur if the peripheral device is not already in use by another host device. For example, the step of data transfer may include a verification as to whether any other device pairs are actively transferring data with the peripheral device before transferring audio data or video data via a second communication protocol (e.g., when the device pair corresponding to the host device and the peripheral device is identified as available for data transfer).

At block 816, a request to disconnect the second communication connection is sent via processor resource in response to a determination that the first device is traveling away from the second device below an automatic disconnection signal strength threshold. In this manner, the user is able to walk towards the trusted peripheral device with the host device and have the peripheral device automatically connect (if currently not in use), and the user is able to automatically terminate data transfer (e.g., video projection) when the user walks away from the peripheral device with the host device past the automatic disconnection distance threshold. The automatic disconnection distance threshold is represented by an automatic disconnection signal strength threshold (which may be calibrated concurrently or serially with the calibration of the automatic connection signal strength for that device pair). The automatic disconnection signal strength threshold may be less than the automatic connection signal strength threshold and mutually exclusive to the automatic connection signal strength threshold. The automatic disconnection signal strength threshold represents a distance threshold that is less than the protocol maximum range of a second communication protocol of the second communication connection.

Referring to FIG. 9, example method 900 of data transfer may generally comprise generating an automatic connection threshold, determining device pair authorization, determining location and trajectory of a device of the device pair, causing a WIFI communication connection, and transferring data via the WIFI communication connection until the source device moves outside the automatic connection threshold.

At block 902, a prompt is caused to display on a first device. The prompt may include a distance selection, such as list of options to choose a distance or a field in which to enter a distance value. At block 904, an automatic connection threshold is determined based on a response to the prompt. This may allow the user to define a distance at which is desired to make an automatic connection, automatic disconnection, and/or automatic data transfer.

At block 906, an RSSI dataset is received corresponding to BLUETOOTH signal of a first device. In some examples, the RSSI dataset is used to identify the location and/or trajectory of a device. In other examples, the RSSI dataset may be used to determine a signal strength corresponding to the automatic connection threshold, automatic disconnection threshold, and/or automatic data transfer threshold.

At block 908, a determination is made by a processor resource as to whether a first device is a known device pair with a second device and whether the known device pair is authorized for automatic connection and/or automatic data transfer.

At block 910, the first device is identified as within an automatic connection distance of the second device based on the RSSI dataset received block 906. At block 912, a trajectory of the first device is determined based on the RSSI dataset received at block 906.

At block 914, a WIFI communication connection is caused to be established between the first device and the second device when the first device is within the automatic connection threshold of the second device (determined at block 910) and the trajectory (determined at block 912) is towards the second device. Security credentials stored with the BLUETOOTH device pair information are used when the second device to establish the WIFI communication connection. In some examples, the WIFI communication connection is made when the second device is available for data transfer or waits until other connections or data transfers have terminated.

At block 916, a signal strength comparison with the automatic connection threshold (or automatic disconnection threshold) is updated, as well as the trajectory if the first device has moved. Device movement may be determined based on changes to the RSSI dataset or using a device sensor such as an inertial measurement unit. At block 918, a determination is made by a processor resource as to whether the location and/or trajectory of a device of the device pair has changed. If the first device has not moved sufficiently outside the automatic connection threshold then data, such as audio data or video data, is transmitted via the WIFI communication connection at block 920. The signal strength and trajectory may be monitored for updates in a continual or scheduled manner (e.g., back to block 916). If the first device has moved sufficiently outside the automatic connection threshold (e.g., past the automatic disconnection threshold) then the WIFI communication connection is disconnected and any data transfer, such as video projection, is terminated. The method 900 may be restarted at block 906 when the device moves back inside to the automatic connection threshold. In this manner, peripheral device may utilize connection methods of BLUETOOTH protocols to establish connections with known device pairs and leverage the BLUETOOTH connection to automatically establish other connections, such as a WIFI connection, to transfer data securely via the second connection while minimizing annoying reconnection prompts for previously established pair connections, for example.

Although the flow diagrams of FIGS. 7-9 illustrate specific orders of execution, the execution order may differ from that which is illustrated. For example, the execution order of the blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. The article "a" as used herein does not limit the element to a single element and may represent multiples of that element. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A system comprising:
a location engine to:
determine a direction of movement between a peripheral device and a host device; and
a protocol engine to:
in response to a determination that the peripheral device has been previously paired with the host device and the direction of movement of the host device is towards the peripheral device, establish a communication connection when a first distance between the peripheral device and the host device is less than a second distance designated for automatic connection, the second distance being less than a maximum distance corresponding to a protocol technology for the communication connection; and
in response to a determination that the direction of movement of the host device is away from the peripheral device, disconnect the communication connection when the first distance between the peripheral device and the host device is greater than the second distance.

2. The system of claim 1, wherein the protocol engine is to:
identify a user preference that designates the second distance as a user-defined connection distance and whether to establish the communication connection between the peripheral device and the host device within the user-defined connection distance; and
select a first protocol to establish the communication connection based on the user preference.

3. The system of claim 1, wherein the protocol engine is to:
disconnect the communication connection when the first distance between the peripheral device and the host device is greater than a third distance, the third distance being less than the maximum distance corresponding to the protocol technology and greater than the second distance by a tolerance distance.

4. The system of claim 1, wherein:
the location engine receives a received signal strength indicator (RSSI) via a first protocol;
the communication connection uses a second protocol different from the first protocol; and
the protocol engine is to transfer audio signals or video signals via the communication connection in response to the communication connection being established when the first distance is less than the second distance.

5. The system of claim 4, wherein the location engine is further to:
identify the first distance of the peripheral device from the host device based on the RSSI from the first protocol; and
perform a signal strength threshold calibration for the host device based on the RSSI associated with a signal from the peripheral device and the second distance.

* * * * *